D. WOLF.
Registering Scales.
No. 83,580.
Patented Oct. 27, 1868.
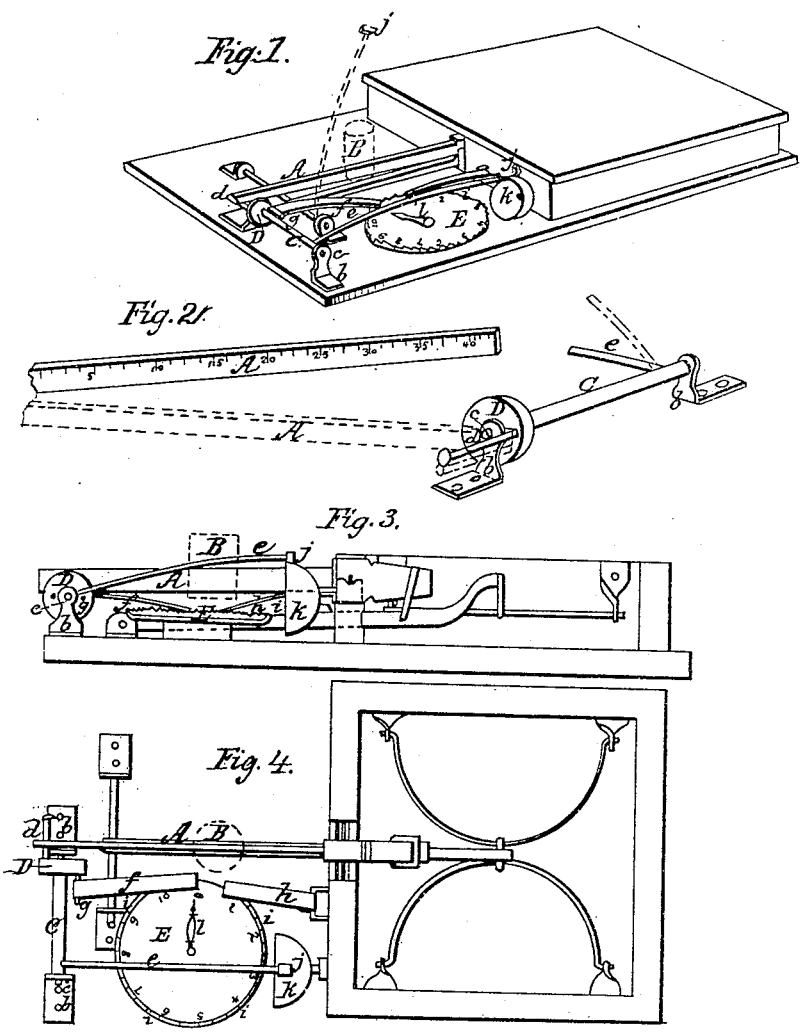
Witnesses,
Inventor,
David Wolf
By
J. B. Woodruff & Son.

United States Patent Office.

DAVID WOLF, OF EASTON, KANSAS.

Letters Patent No. 83,580, dated October 27, 1868.

IMPROVEMENT IN REGISTERING-SCALES.

The Schedule referred to in these Letters Patent and making part of the same.

*To all whom it may concern:*

Be it known that I, DAVID WOLF, of the town of Easton, in the county of Leavenworth, in the State of Kansas, have invented certain new and useful Improvements in Index-Plates, for Scales, or Weighing-Apparatus for Registering the Number of Equal Parts of any Substance Weighed; and the following is a full, clear, and exact description of the same, reference being had to the accompanying drawings, making a part of this specification, in which—

Figure 1 represents a perspective view of a platform-scale, showing the counting-mechanism.

Figure 2 shows an enlarged view of the pawl-shaft, and beam that operates it, broken off.

Figure 3 is a sectional edge view of all the weighing and counting-apparatus, without the platform.

Figure 4 shows a plan or top view of the same.

The object of my invention is to facilitate the counting of the number of loads, bales, packages, or measure of any substance where the valuation is determined by its weight.

My invention consists in the arrangement and combination of a simple mechanism to count or tally correctly the number of equal parts, such as tons, hundreds, quarters, bushels, halves, pecks, or lesser quantities, by setting the weight on the arm, to balance the portion to be measured, and when the required quantity is put on the scale to balance, the signal is given by a stroke on a bell, and when it is removed from the scale or platform, the counting plate is moved one notch, so that by a look at the dial-plate the true number of the measures or loads taken from the platform is easily read and registered. Multiplying dial-plates may be attached, so that not only hundreds, but thousands, and tens of thousands, may be tallied and registered.

To enable others to make and use my invention, I will describe it more fully, referring to the drawings, and to the letters marked thereon.

The platform-scale mechanism may be the same as those in common use, the scale-beam A graduated and numbered on both sides, with a movable weight, B, to slide or be suspended from the beam. There may also be counter-weights placed on the extreme end of the beam, or elsewhere, for weighing the more heavy articles in large quantities.

At or near the extreme end of the lever A there is placed a shaft, C, hung on journals $c\ c$, in standards $b\ b$, the shaft C being provided with a wheel, D, into which a wrist-pin, $d$, is set, on a line parallel with the shaft C, so that when the scale-beam A falls upon it, it operates as a crank to lift the hammer-shaft $e$, and work the pawl $f$, which is attached to and connected with it by the pin $g$, in the reverse side of the wheel D.

The hook-pawl $f$ works on the edge or ratchet, $i\ i$, of the dial-plate E, so that every time the weight is removed from the platform, and the beam A rests upon the pin $d$, to press it down, the dial-plate E is moved one notch, and held by the spring-catch $h$, thus counting each time the scale is operated.

The quantity of the coal, grain, or other substance to be weighed in equal parts is given by placing the poise B on the beam A, to balance the portion to be measured, which is put in or on the platform, and when the required quantity is furnished, the beam A is lifted, and the hammer $j$ will strike the bell $k$, which is the signal to stop, and remove from the scale, and, by the act of so doing, the number of weighings is counted for registry, it being easily determined at any time, by the position the dial-plate stands in relation to the pointer $l$ on its face.

My invention, as shown and described, has only the counting and talley-plate up to one hundred; but it will be readily seen that multiplying-disks may be added, so that a very large count can be made and retained with more accuracy than when left to a tally-man, and besides, it dispenses with a tally-man, in handling coal, grain, or other substances, as the measuring or weighing is going on.

The apparatus is cheap in its construction, and may be easily attached to any size, kind, or style of scales, and is adapted to any kind of measures, and is applicable to all trades and business, where measuring and weighing by the quantity are done, and given quantities are kept registered. It is regarded by the farmers in the great grain-growing region of the West as a great saving of time and labor in taking count of their corn and wheat, and almost indispensable in keeping a correct tally of the large quantities that have to be moved, weighed, or measured in a given time.

The invention is also equally well adapted to large flouring-mills for keeping a correct tally of the barrels or bags that are packed; also, for putting a uniform quantity of cotton, hemp, or other substance into bales, as well as for sacks of coffee, rice, spices, dyestuffs, drugs, or anything in smaller parcels.

Having thus fully described my invention,

What I claim as new, and desire to secure by Letters Patent, is—

The arrangement of the dial-plate E, pawl $f$, shaft C, wheel D, with its pin $g$ and wrist-pin $d$, the hammer $j$, and bell $k$, as constructed, in combination with the beam A, to be operated by a platform or weighing-scale, substantially in the manner as described, for the purposes herein set forth.

In testimony whereof, I hereunto subscribe my name in the presence of—

DAVID WOLF.

Witnesses:
 HENRY J. ADAMS,
 J. W. TAYLOR.